US012465085B2

(12) United States Patent
Van Lancker et al.

(10) Patent No.: US 12,465,085 B2
(45) Date of Patent: Nov. 11, 2025

(54) AEROSOL-GENERATING DEVICE WITH HEATING COATING

(71) Applicant: Philip Morris Products S.A., Neuchatel (CH)

(72) Inventors: Pieter Van Lancker, Kortrijk (BE); Louis-Philippe Vancraeynest, Kortrijk (BE); Simon Desnerck, Kortrijk (BE)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 18/430,281

(22) Filed: Feb. 1, 2024

(65) Prior Publication Data

US 2024/0172796 A1 May 30, 2024

Related U.S. Application Data

(63) Continuation of application No. 16/973,174, filed as application No. PCT/EP2019/065484 on Jun. 13, 2019, now Pat. No. 11,930,849.

(30) Foreign Application Priority Data

Jun. 14, 2018 (EP) .................................... 18177756

(51) Int. Cl.
*A24F 40/46* (2020.01)
*A24F 40/40* (2020.01)
(Continued)

(52) U.S. Cl.
CPC ............... *A24F 40/46* (2020.01); *H05B 3/22* (2013.01); *A24F 40/20* (2020.01); *A24F 40/70* (2020.01)

(58) Field of Classification Search
CPC .......... A24F 40/20; A24F 40/46; A24F 40/70; H05B 3/22
See application file for complete search history.

(56) References Cited

U.S. PATENT DOCUMENTS 5,573,692 A 11/1996 Das et al.
5,665,262 A * 9/1997 Hajaligol ................ A24F 40/46 131/194
(Continued)

FOREIGN PATENT DOCUMENTS

CN 1126425 A 7/1996
CN 103974640 A 8/2014
(Continued)

OTHER PUBLICATIONS

Japanese Office Action issued Apr. 30, 2024 in Japanese Patent Application No. 2022-19895, 9 pages.
(Continued)

*Primary Examiner* — Abdullah A Riyami
*Assistant Examiner* — Thang H Nguyen
(74) *Attorney, Agent, or Firm* — Oblon, McClelland, Maier & Neustadt, L.L.P.

(57) ABSTRACT

A portable battery-powered aerosol-generating device for generating an inhalable aerosol is provided, the portable battery-powered aerosol-generating device including a heating element, the heating element including electrically resistive particles and a polymer binder, and the electrically resistive particles being embedded in the binder. A heating element for the portable battery-powered aerosol generating device is also provided.

14 Claims, 5 Drawing Sheets

(51) Int. Cl.

| | |
|---|---|
| ***H05B 3/22*** | (2006.01) |
| *A24F 40/20* | (2020.01) |
| *A24F 40/70* | (2020.01) |

(56) References Cited

U.S. PATENT DOCUMENTS

| | | | | |
|---|---|---|---|---|
| 6,053,176 | A * | 4/2000 | Adams | A24F 40/53 131/329 |
| 11,134,717 | B2 * | 10/2021 | Naughton | A24F 40/85 |
| 11,369,138 | B2 * | 6/2022 | Van Lancker | A24F 1/20 |
| 2002/0078951 | A1 | 6/2002 | Nichols et al. | |
| 2005/0133029 | A1 | 6/2005 | Nichols et al. | |
| 2008/0311176 | A1 * | 12/2008 | Hale | A61P 25/04 424/443 |
| 2014/0305449 | A1 | 10/2014 | Plojoux et al. | |
| 2015/0090280 | A1 * | 4/2015 | Chen | A61M 15/06 131/329 |
| 2016/0338402 | A1 * | 11/2016 | Buehler | A24B 15/283 |
| 2018/0014575 | A1 * | 1/2018 | Fursa | A24F 40/42 |
| 2018/0049472 | A1 | 2/2018 | Mahler et al. | |
| 2018/0070640 | A1 * | 3/2018 | Bessant | A24F 40/40 |
| 2020/0253280 | A1 * | 8/2020 | Thorsen | A24F 40/46 |
| 2021/0251289 | A1 * | 8/2021 | Van Lancker | A24F 40/70 |

FOREIGN PATENT DOCUMENTS

| | | | | |
|---|---|---|---|---|
| CN | 104055223 | A | 9/2014 | |
| CN | 107205494 | A | 9/2017 | |
| EA | 000244 | B1 | 2/1999 | |
| EA | 023392 | B1 | 5/2016 | |
| EP | 0 123 127 | A1 | 10/1984 | |
| EP | 0 703 734 | A1 | 4/1996 | |
| GB | 718161 | A | 11/1954 | |
| GB | 1286815 | A | 8/1972 | |
| JP | 57-124874 | A | 8/1982 | |
| JP | 8-511176 | A | 11/1996 | |
| JP | 2001-60489 | A | 3/2001 | |
| JP | 2004-63351 | A | 2/2004 | |
| JP | 2009-283415 | | 12/2009 | |
| JP | 2013-509160 | A | 3/2013 | |
| RU | 2 132 629 | C1 | 7/1999 | |
| WO | WO 95/27412 | A1 | 10/1995 | |
| WO | WO 2010/047389 | A1 | 4/2010 | |
| WO | WO 2011/050964 | A1 | 5/2011 | |
| WO | WO 2013/098395 | A1 | 7/2013 | |
| WO | WO 2015/197850 | A1 | 12/2015 | |
| WO | WO 2016/124550 | A1 | 8/2016 | |
| WO | WO 2016/150922 | A2 | 9/2016 | |
| WO | WO-2017194769 | A1 * | 11/2017 | H05B 3/46 |
| WO | WO 2018/019855 | A1 | 2/2018 | |
| WO | WO 2018/041924 | A1 | 3/2018 | |
| WO | WO 2019/035056 | A1 | 2/2019 | |

OTHER PUBLICATIONS

International Search Report and Written Opinion issued on Sep. 26, 2019 in PCT/EP2019/065484 filed on Jun. 13, 2019.

English translation of Russian Search Report issued Jul. 7, 2021 in Russian Patent Application No. 2021100158/03(000279), 2 pages.

Office Action issued Feb. 7, 2022, in corresponding Japanese Patent Application No. 2021-517531 (with English Translation), 15 pages.

Combined Chinese Office Action and Search Report issued on Feb. 10, 2023 in Chinese Patent Application No. 201980034427.4 (with English translation), 22 pages.

Korean Office Action issued Feb. 23, 2023 in Korean Patent Application No. 10-2020-7034234 (with English Translation), 12 pages.

Japanese Office Action issued on Sep. 26, 2023 in Japanese Patent Application No. 2021-517531, 12 pages.

Combined Chinese Office Action and Search Report issued on Sep. 28, 2023 in Chinese Patent Application No. 201980034427.4 (with English translation), 20 pages.

Korean Office Action mailed on Dec. 22, 2023 issued in Korean Patent Application No. 10-2020-7034234 filed on Nov. 27, 2020, with English Translation, total 12 pages.

European Office Action issued Nov. 4, 2024 in European Patent Application No. 19 731 233.3, 6 pages.

Japanese Office Action issued Apr. 24, 2025 in corresponding Japanese Patent Application No. 2024-026161, 4 pages.

* cited by examiner

AEROSOL-GENERATING DEVICE WITH HEATING COATING

CROSS-REFERENCE TO RELATED APPLICATIONS

This application is a continuation of and claims benefit under 35 U.S.C. § 120 to U.S. application Ser. No. 16/973,174, filed Dec. 8, 2020, which is a U.S. National Stage application of PCT/EP2019/065484, filed on Jun. 13, 2019, and claims the benefit of priority under 35 U.S.C. § 119 from 18177756.6, filed on Jun. 14, 2018, the entire contents of each of which are incorporated herein by reference.

TECHNICAL FIELD

The invention relates to an aerosol-generating device for generating an inhalable aerosol. Aerosol-generating devices are known which heat but not burn aerosol-generating substrate such as tobacco. These devices heat aerosol-generating substrate to a sufficiently high temperature for creating an aerosol for inhalation by the user.

DESCRIPTION OF THE RELATED ART

These aerosol-generating devices typically comprise a heating chamber, wherein a relatively complex heating element is arranged within the heating chamber or surrounding the heating chamber. An aerosol-generating article comprising aerosol-generating substrate can be inserted into the heating chamber and heated by the heating element. The heating element is typically configured as a heating blade and penetrates into the aerosol-generating substrate of the aerosol-generating article when the article is inserted into the heating chamber. Conventional heating elements predominantly heat the center of the aerosol-generating substrate.

Consequently, there is a need for providing a heating element which is inexpensive and enables uniform heating.

SUMMARY

For solving this and further objects, the present invention proposes an aerosol-generating device for generating an inhalable aerosol. The device comprises a heating chamber configured to receive an aerosol-generating article containing aerosol-generating substrate. The heating chamber comprises a heating element. The heating element is an electrically resistive coating.

BRIEF DESCRIPTION OF THE DRAWINGS

The invention will be described in more detail in the following with reference to the accompanying drawings, in which.

DETAILED DESCRIPTION

Figure 1:
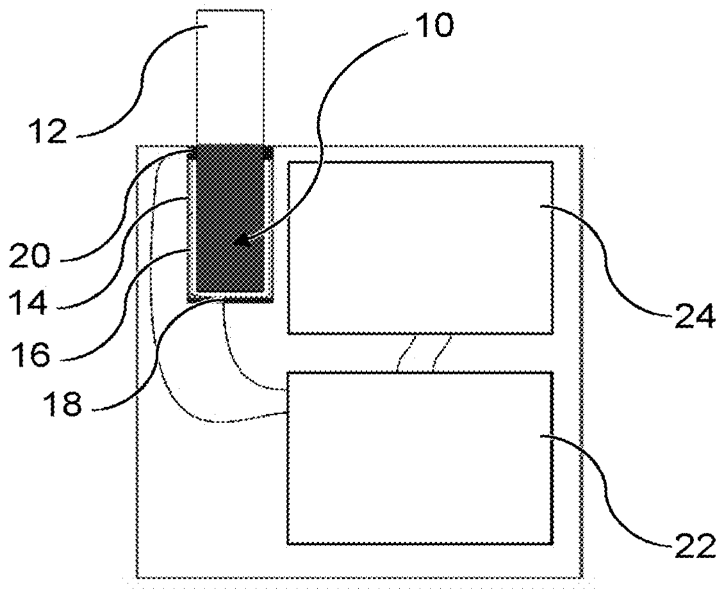
FIG. 1 shows an aerosol-generating device according to the present invention.

Configuring the heating element as an electrically resistive coating has multiple advantages. The coating can achieve a more even heat distribution, since the coating may heat a relatively large area of an inserted aerosol-generating article. The more even heat distribution also has the effect that the heating may be more energy efficient, since the heater may be operated at a slightly lower temperature.

The possible shape of the heating element may be varied, when the heating element is configured as an electrically resistive coating. The shape of the heating element is thus not limited to conventional heater shapes such as a single directionally bent shape, for example a cylinder or cone. Irregular shapes such as dome, parabolic or irregularly shaped surfaces are possible with the electrically resistive coating.

Conventional coil-shaped heaters may induce an electromagnetic field which can cause electromagnetic interference. The electromagnetic interference may necessitate additional layers of metallic material for shielding off the electromagnetic field. In the present invention, no such further components are necessary due to the fact that the electrically resistive coating does not produce an electromagnetic field causing electromagnetic interference.

The electrically resistive coating (or film) may be formed by Atmospheric Pressure Chemical Vapor Deposition (APCVD), vacuum evaporation, sputtering, conventional CVD, plasma CVD, or flame pyrolysis. Alternatively, the material may be applied using other conventional coating methods such as wet spraying, powder coating or dip coating. In some embodiments, the coating may be applied by powder sintering. Depending on the chosen material composition and application method, the coating may require a drying, curing or fixation step.

The electrically resistive coating may be applied to the sidewall of the heating chamber, particularly the inner wall of the sidewall facing the inner of the heating chamber.

The coating being provided on the sidewall of the heating chamber may enable direct heating of aerosol-generating substrate contained in an aerosol-generating article inserted into a heating chamber. The sidewall of the heating chamber preferably comprises the base of the heating chamber as well as the wall surrounding the longitudinal axis of the heating chamber. The heating chamber comprises an opening for inserting the aerosol-generating article, which does not form part of the sidewall. The heating chamber may have a hollow tubular shape for insertion of an aerosol-generating article with a cylindrical shape resembling a conventional cigarette. The opening of the heating chamber for inserting the article may be circular.

The electrically resistive coating may be provided in addition to a further heating element such as a heating blade arranged centrally in the heating chamber. The aerosol-generating substrate may then be uniformly heated form the inside as well as from the outside.

The electrically resistive coating may comprise electrically resistive particles and a binder.

The resistive particles provide the resistive heating properties in the coating. Suitable electrically resistive materials include but are not limited to: semiconductors such as doped ceramics, electrically conductive ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminum-, titanium-, zirconium-, hafnium-, niobium-, molybdenum-, tantalum-, tungsten-, tin-, gallium-, manganese-, and iron-containing alloys, and superalloys based on nickel, iron, cobalt, stainless steel, TIMETAL®, and iron-manganese-aluminum based alloys. In composite materials, the electrically resistive material may optionally be embedded in, encapsulated or coated with an insulating material or vice-versa, depending on the kinetics of energy transfer and the external physiochemical properties required.

In another embodiment the electrically resistive coating material consists of a thin film of a molecularly bonded material such as, but not limited to tin oxide or doped tin oxide created from independent precursors such as tin chloride, methyl alcohol, H2O, and dopants DFE such as di-flouroethane (DFE) and antimony pentachloride.

The binder binds the resistive material particles and can be a polymer, a ceramic material or an enamel frit. Suitable polymers include but are not limited to fluoropolymers, acrylics, and acrylate.

The binder may be configured to adhere to the sidewall of the heating chamber. The binder may be configured as a material resistant to mechanical damage so that the electrically resistive coating is not damaged during insertion and removal of aerosol-generating articles and operation of the aerosol-generating device.

A substrate may be arranged between the electrically resistive coating and the heating chamber.

The substrate on which the coating material is applied may be configured to withstand the operating temperature of the electrically resistive coating and preferably is not electrically conductive. Suitable materials include but are not limited to ceramic materials, Beryllium Oxide (BeO), glass ceramics, glass family materials, Aluminum Nitride, Quartz and Enameled metals. The substrate may optimize bonding between the electrically resistive coating and the sidewall of the heating chamber.

The substrate may be configured thermally insulating. Using a thermally insulating material for the substrate inhibits heat transfer through the sidewall of the heating chamber and directs the generated heat towards the inside of the heating chamber and therefore an inserted aerosol-generating article. This enhances the energy efficiency and performance of the device.

The device may further comprise a controller, a power supply and contacts, wherein the contacts electrically contact the electrically resistive coating, and wherein the controller may be configured to control the supply of power from the power supply to the electrically resistive coating via the contacts.

The power supply is preferably configured as a battery. The contacts are preferably arranged distanced from each other at opposite ends of the electrically resistive coating such that the electrical power supplied to the electrically resistive coating runs uniformly through the coating thereby creating a uniform heat distribution over the surface of the coating. One contact may be arranged at the base of the sidewall of the heating chamber, while the second contact may be in the shape of a ring arranged at the radial circumference of the sidewall of the heating chamber. In other words, one contact may be arranged at the base of the heating chamber, while the other contact may be arranged near the opening of the heating chamber.

The electrically resistive coating may be applied to the entire sidewall of the heating chamber. Applying the coating on the entire sidewall of the heating chamber may facilitate uniform heating of the aerosol-generating article inserted into the heating chamber.

The electrically resistive coating may be applied to a section of the sidewall of the heating chamber adjacent to the opening of the heating chamber.

In this embodiment, the electrically resistive coating is not provided at the base of the heating chamber. Thus, the aerosol-generating article is predominantly heated adjacent to the opening of the heating chamber. This has the beneficial effect that fewer residues escape the aerosol-generating article near the base of the heating chamber. Thus, the contamination of the heating chamber after removing an aerosol-generating article can be reduced. In this regard, typical aerosol-generating articles comprise an outer wrapper arranged around the outer circumference of the aerosol-generating article, while the portion of the aerosol-generating article facing the base of the heating chamber during and after insertion of the aerosol-generating article into the heating chamber is not covered by a wrapper. Thus, residues of aerosol-generating substrate may predominantly exit the aerosol-generating article through this part of the article. By not providing the electrically resistive coating at the base of the heating chamber, heating of substrate in this area is reduced, thereby reducing substrate egress in solid or gaseous form from the article adjacent to the base of the heating chamber. Pollution of the heating chamber can thus be efficiently reduced.

The electrically resistive coating may be applied to multiple separate sections of the heating chamber, wherein each section of the electrically resistive coating may be configured to be separately controllable and operatable.

Providing multiple sections of electrically resistive coating has the effect that multiple heating elements are created. These multiple heating elements can be separately controlled to heat separate portions of the aerosol-generating substrate in an aerosol-generating article being inserted into the heating chamber. Preferably, during operation of the device, for example when a user is puffing on the device, a first portion of the aerosol-generating substrate is heated for aerosol generation by operating a first section of the electrically resistive coating. After a puff of a user or after depletion of the aerosol-generating substrate after a predetermined time, a second section of the electrically resistive coating may be activated and the first section may be deactivated. In this way, multiple portions of aerosol-generating substrate may be subsequently heated for aerosol generation by means of subsequently operating multiple sections of electrically resistive coating. The different sections of electrically resistive coating are consequently provided with separate contacts. Also, the controller may comprise multiple controller sections for controlling the multiple sections of electrically resistive coating.

The thickness of the electrically resistive coating may be configured varying at different positions.

By modifying the thickness of the electrically resistive coating at different positions, different electrical resistances are realized on different positions of the electrically resistive coating. Hence, different heating temperatures are realized with the same voltage in these different sections or positions of the electrically resistive coating. This may be utilized for volatilizing different portions of the aerosol-generating substrate in a different way. Multiple independently controllable sections of electrically resistive coating as described above may be combined with different thicknesses of these different sections.

The electrically resistive coating may be applied to the outside of the sidewall of the heating chamber, wherein the sidewall may be configured heat conductive.

This embodiment is particularly advantageous, if the electrically resistive coating is fragile, hard to clean or prone to organic contamination. Consequently, the electrically resistive coating may be applied on the outer surface of the sidewall of the heating chamber between the housing of the aerosol-generating device and the sidewall of the heating chamber. The housing of the aerosol-generating device as well as the sidewall of the heating chamber thus prevents the electrically resistive coating from coming in contact with the aerosol-generating article, aerosol-generating substrate or other external elements, which may harm the electrically resistive coating. In all embodiments described in the context of this invention, the electrically resistive coating may either be applied directly to the sidewall of the heating chamber facing the inner of the heating chamber or on the outside of the sidewall of the heating chamber as described in the last embodiment. Preferably, the coating is applied to the inner side of the sidewall facing the inner of the heating chamber and not on the outside of the heating chamber.

The base of the heating chamber may have the shape of a hemisphere. In this embodiment, the heat energy generated at the base of the heating chamber within the hemisphere is channeled towards the center point of the projected sphere. Hence, the aerosol-generating substrate of the aerosol-generating article positioned in this point is rapidly heated for creating an aerosol very fast. The aerosol-generating coating provided in this embodiment at the base of the heating chamber shaped as a hemisphere may be provided as a section of electrically resistive coating which can be controlled separately. This section may be operated in the beginning to create aerosol very fast, while further sections of electrically resistive coating may be operated for a longer duration to create aerosol for a prolonged period of time.

The invention further relates to a method of manufacturing an aerosol-generating device for generating an inhalable aerosol, the method comprising the following steps:

i) providing a heating chamber configured to receive an aerosol-generating article containing aerosol-generating substrate; and ii) coating the heating chamber with an electrically resistive coating acting as a heating element.

FIG. 1 shows an aerosol-generating device according to the present invention. The device comprises a heating chamber 10. An aerosol-generating article 12 may be inserted into the heating chamber 10. The heating chamber 10 comprises a sidewall 14. An electrically resistive coating 16 is provided on the sidewall 14 of the heating chamber 10 for facilitating a heating element.

The electrically resistive coating 16 may be provided in addition to a further heating element such as a heating pin or heating blade arranged centrally aligned along the longitudinal axis of the heating chamber 10 or a heating coil arranged around the heating chamber 10. Preferably, however, the electrically resistive coating 16 is the only heating element of the aerosol-generating device for heating aerosol-generating substrate contained in the aerosol-generating article 12.

In FIG. 1, the electrically resistive coating 16 is applied to the inner surface of the sidewall 14 of the heating chamber 10. Thus, the electrically resistive coating 16 radiates heat directly towards the aerosol-generating article 12 inserted into the heating chamber 10.

FIG. 1 further shows contacts 18, 20 being electrically connected to the electrically resistive coating 16 so that an electric current can be supplied towards the electrically resistive coating 16 and run through the electrically resistive coating 16. As can be seen in FIG. 1, a first contact 18 is arranged at the base of the heating chamber 10 while a second contact 20 is arranged near the opening of the heating chamber 10. In this way, the current running through the electrically resistive coating 16 and provided to the electrically resistive coating 16 by means of the contacts 18, 20 runs uniformly through the electrically resistive coating 16. The second electrode 20 is preferably provided as a ring-shaped electrode adjacent to the opening of the heating chamber 10.

For supplying the electric energy towards and through the electrically resistive coating 16, a controller 22 is provided which is contacted to a power supply 24. The power supply 24 is configured as a battery.

Figure 2A:
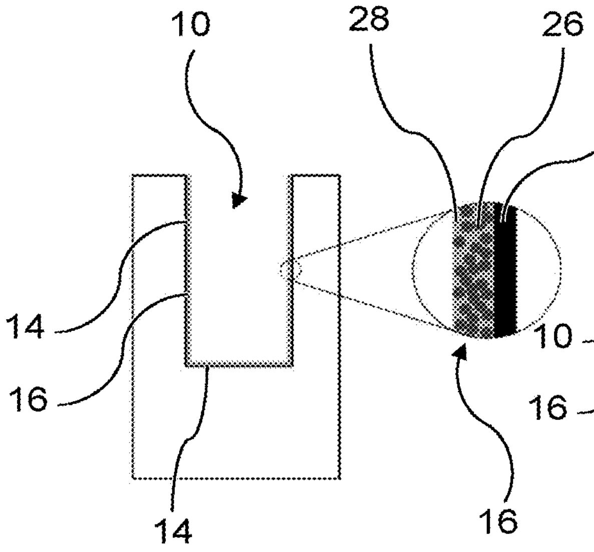
FIGS. 2A-2C show embodiments of a heating element of the aerosol-generating device provided on the inside of the sidewall of a heating chamber and provided on the outside of the sidewall of the heating chamber.
Figure 2B:
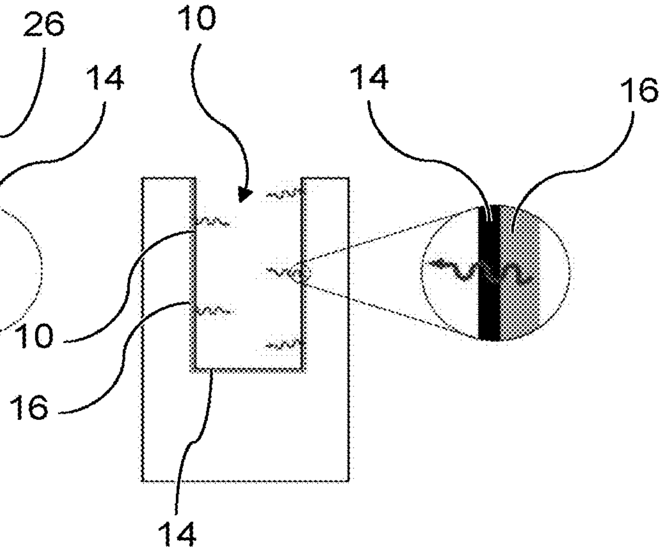
Figure 2C:
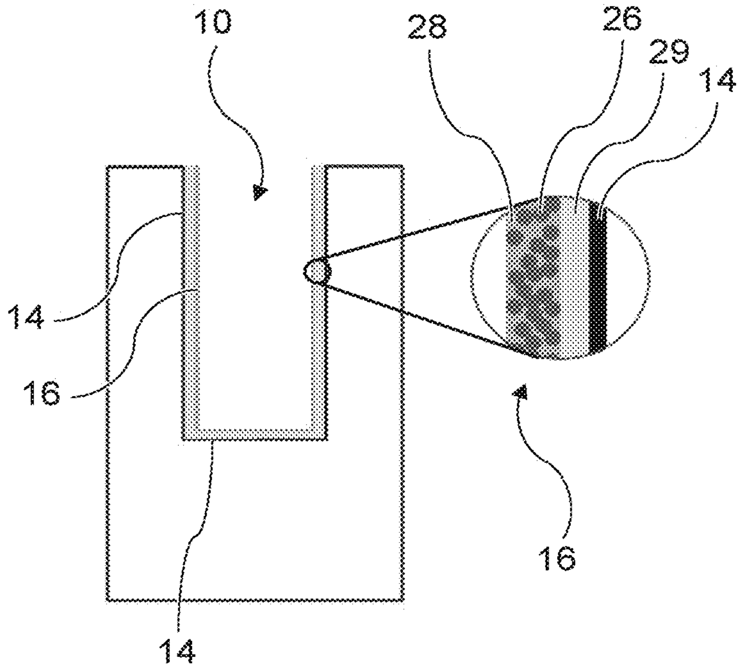

FIGS. 2A-2C show embodiments of the electrically resistive coating 16. In FIG. 2A, the electrically resistive coating 16 is applied directly onto the inner surface of the sidewall 14 of the heating chamber 10. The electrically resistive coating 16 comprises electrically resistive particles 26 as well as a binder 28. The electrically resistive particles 26 are embedded in the binder 28. The binder 28 thus acts as a carrier.

In FIG. 2B, the electrically resistive coating 16 is applied to the outside of the sidewall 14 of the heating chamber 10. The electrically resistive coating 16 in this embodiment and in all other embodiments may be configured as electrically resistive coating 16 as depicted in FIG. 2A, i.e. consisting of electrically resistive particles 26 and a binder 28. In all embodiments, a layer of a single material as shown in FIG. 2B may also be utilized for the electrically resistive coating 16. Providing the electrically resistive coating 16 on the outside of the sidewall 14 of the heating chamber 10 as depicted in FIG. 2B has the advantage that the electrically resistive coating 16 is protected by the sidewall 14 of the heating chamber 10 from contamination or damage. In the embodiment shown in FIG. 2B, the sidewall 14 of the heating chamber 10 is preferably made from a heat conductive material such that heat emitted by the electrically resistive coating 16 is transmitted to the inner of the heating chamber 10 and into aerosol-generating substrate arranged in the heating chamber 10 by means of the insertion of an aerosol-generating article 12. As shown in FIG. 2C, a substrate 29 may be arranged between the electrically resistive coating 16 and the sidewall 14 of the heating chamber 10.

Figures 3A, 3B, 3C:
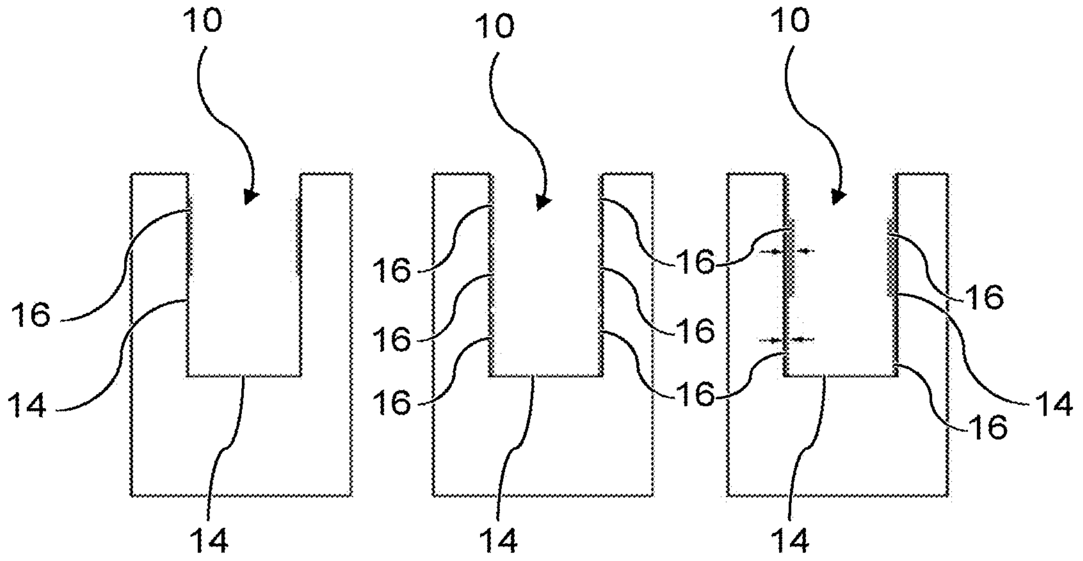
FIGS. 3A-3C show embodiments of the heating element positioning and of heating element sections.

FIGS. 3A-3C show multiple embodiments of the arrangement of the electrically resistive coating 16. In FIG. 3A, the electrically resistive coating 16 is not provided on the entire sidewall 14 of the heating chamber 10 as depicted in FIGS. 1 and 2. In the embodiment shown in FIG. 3A, the electrically resistive coating 16 is only provided on a section of the heating chamber 10 adjacent to the opening of the heating chamber 10. In this embodiment, an aerosol-generating article 12 inserted to the heating chamber 10 will not be uniformly heated by the electrically resistive coating 16, but selectively heated depending upon the positioning of the electrically resistive coating 16. As shown in FIG. 3A, the electrically resistive coating 16 preferably heats the portion of the aerosol-generating article 12 positioned adjacent to the opening of the heating chamber 10. In this way, the heating of aerosol-generating substrate near the electrically resistive coating 16 is predominantly heated. Thereby, contamination of the heating chamber 10 by residues of the aerosol-generating substrate can be reduced, which escape the part of the aerosol-generating article 12 facing the base of the heating chamber 10.

In the embodiment shown in FIG. 3B, multiple sections of electrically resistive coating 16 are provided, which are individually and separately controllable and operatable. These different sections of electrically resistive coating 16 can be utilized to heat different sections of aerosol-generating substrate.

In FIG. 3C, an embodiment is shown in which different sections of electrically resistive coating 16 are provided, which each have different thicknesses. These different thicknesses result in a different electrical resistance of the respective sections and therefore different heating temperatures. The sections depicted in FIG. 3C may be configured separately controllable and operatable or as a single coating layer.

Figure 4:
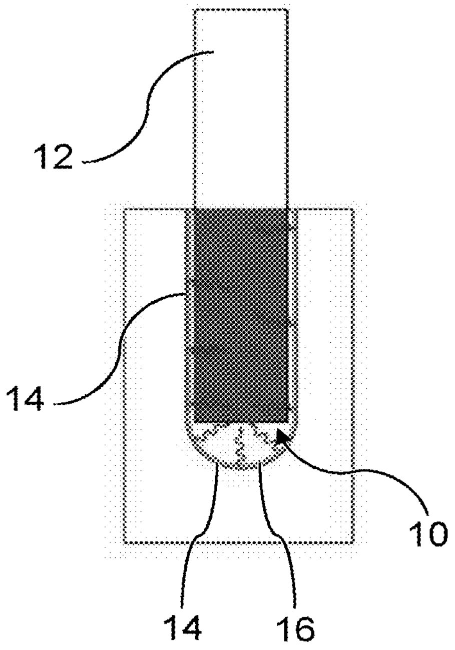
FIG. 4 shows an embodiment of the base of the heating chamber having a hemispheric shape.

FIG. 4 shows an embodiment of the heating chamber 10, in which the base of the heating chamber 10 is formed as a hemisphere. Consequently, the electrically resistive coating 16 applied in the area of the hemisphere has a hemispherical shape. The heat emitted from the coating in this area is thus focused on a central point of the aerosol-generating article 12 thereby resulting in a rapid heating and aerosol generation in this part of the aerosol-generating substrate of the aerosol-generating article 12.

The invention claimed is:

1. A portable battery-powered aerosol-generating device for generating an inhalable aerosol,
- wherein the portable battery-powered aerosol-generating device comprises a heating element,
- wherein the heating element comprises electrically resistive particles and a polymer binder,
- wherein the electrically resistive particles are embedded in the polymer binder,
- wherein the portable battery-powered aerosol-generating device is configured to receive an aerosol-generating article containing aerosol-generating substrate,
- wherein the portable battery-powered aerosol-generating device further comprises a controller, a power supply, and contacts,
- wherein the power supply is configured as a battery,
- wherein the contacts are arranged distanced from each other at opposite ends of the heating element,
- wherein at least one contact is in a shape of a ring, and
- wherein the at least one contact in the shape of a ring is arranged at a radial circumference of the heating element.

2. The portable battery-powered aerosol-generating device according to claim 1, wherein the heating element has a cylinder shape.

3. The portable battery-powered aerosol-generating device according to claim 2, wherein the heating element has a hollow tubular shape.

4. The portable battery-powered aerosol-generating device according to claim 1, wherein the heating element is configured to electrically contact contacts of the portable battery-powered aerosol-generating device.

5. The portable battery-powered aerosol-generating device according to claim 1, wherein the heating element further comprises multiple separate sections.

6. The portable battery-powered aerosol-generating device according to claim 1, wherein the electrically resistive particles comprise metal or graphite.

7. The portable battery-powered aerosol-generating device according to claim 6, wherein the electrically resistive particles consist of metal or graphite.

8. The portable battery-powered aerosol-generating device according to claim 1,
- wherein the contacts electrically contact the heating element, and
- wherein the controller is configured to control a supply of power from the power supply to the heating element via the contacts.

9. The portable battery-powered aerosol-generating device according to claim 1, wherein a second contact is arranged at a base of the heating element.

10. The portable battery-powered aerosol-generating device according to claim 1, wherein the heating element is configured to heat the aerosol-generating substrate to a sufficiently high temperature for creating an aerosol for inhalation by a user.

11. The portable battery-powered aerosol-generating device according to claim 1, wherein the electrically resistive particles embedded in the polymer binder are provided on a section of the heating element.

12. The portable battery-powered aerosol-generating device according to claim 1, wherein the electrically resistive particles embedded in the polymer binder are provided on different sections of the heating element and with different thicknesses.

13. A heating element for a portable battery-powered aerosol generating device for generating an inhalable aerosol, the heating element comprising:
- electrically resistive particles and a polymer binder, wherein the electrically resistive particles are embedded in the polymer binder; and
- two electrical contacts configured to electrically contact a material of the heating element, wherein at least one of the electrical contacts is in a shape of a ring.

14. The heating element according to claim 13, wherein the electrically resistive particles comprise metal or graphite.

* * * * *